United States Patent [19]

Thompson et al.

[11] 4,440,587
[45] Apr. 3, 1984

[54] METHOD OF MAKING ROCKET MOTOR CASE WITH INTEGRAL NOZZLE

[75] Inventors: Richard J. Thompson; Ocke C. Fruchtnicht, both of Huntsville, Ala.

[73] Assignee: The United States of America as represented by the Secretary of the Army, Washington, D.C.

[21] Appl. No.: 404,253

[22] Filed: Aug. 2, 1982

[51] Int. Cl.³ .................. B32B 31/00; B65H 54/64
[52] U.S. Cl. ........................... 156/154; 242/2; 29/157 C; 29/452; 156/175; 156/165; 156/161; 60/909
[58] Field of Search ............... 156/154, 161, 162, 172, 156/187, 195, 165, 173, 175, 425; 242/2, 3, 7.21, 7.23; 29/157 C; 60/909, 253

[56] References Cited
U.S. PATENT DOCUMENTS

| | | | |
|---|---|---|---|
| 3,073,475 | 1/1963 | Fingerhut | 220/3 |
| 3,280,850 | 10/1966 | Gorcey et al. | 156/172 X |
| 3,745,927 | 7/1973 | Tanner et al. | 156/172 X |
| 3,915,776 | 10/1975 | Kaempen | 156/161 |
| 3,957,416 | 5/1976 | Kaempen | 156/161 X |
| 3,970,495 | 7/1976 | Ashton et al. | 156/162 |
| 4,053,343 | 10/1977 | Carter | 156/172 |
| 4,054,029 | 10/1977 | Sayles | 60/909 |
| 4,137,950 | 2/1979 | Briscall | 156/172 X |
| 4,152,183 | 5/1979 | Honacker et al. | 156/154 X |
| 4,214,932 | 7/1980 | Van Auken | 156/187 |
| 4,329,193 | 5/1982 | Sznopek et al. | 156/162 |

OTHER PUBLICATIONS

Fiberglass-Reinforced Plastics as a Rocket Structural Material, by Miller et al., Jet Propulsion, Nov. 1956, pp. 969-972.

Primary Examiner—Charlie T. Moon
Assistant Examiner—Ronald S. Wallace
Attorney, Agent, or Firm—Robert P. Gibson; Anthony T. Lane; James T. Deaton

[57] ABSTRACT

A method of making a rocket motor case with an integral nozzle in which the rocket motor has a large length to diameter ratio and is made by applying a linear wrap of fibers as a first layer on a mandrel and then by applying radial wraps over said linear wrap and also conforming the linear fibers to the shape of the nozzle after applying the linear fibers on said mandrel to provide a structure that has sufficient stiffness to accomplish the desired result of a large length to diameter rocket motor case.

4 Claims, 4 Drawing Figures

METHOD OF MAKING ROCKET MOTOR CASE WITH INTEGRAL NOZZLE

DEDICATORY CLAUSE

The invention described herein may be manufactured, used, and licensed by or for the Government for governmental purposes without the payment to us of any royalties thereon.

BACKGROUND OF THE INVENTION

In the past, the conventional approach to the fabrication of a rocket motor case with an integral wound nozzle has been to select a helix wind angle that satisfies the relation:

$$\text{helix angle} = \sin^{-1} R_t/R_c$$

where
$R_t$ = Radius @ throat
$R_c$ = Radius of Cylinder.

The fiber that is wound on the mandrel is placed under tension and follows a path on the mandrel surface over the dome for the housing, through the throat section and along the expansion cone such as illustrated in FIG. 1. The winding of the rocket motor case and integrally wound nozzle continues until the mandrel is covered with sufficient material of the fiber to carry the loads and perform the function of a rocket motor case with an integral nozzle.

As can be seen, the winding of a rocket motor case with an integral nozzle is limited by the procedures of the prior art due to the helix angles that can be used to make the integral rocket motor case and nozzle using the wrapping procedures illustrated in FIG. 1. Using the helix angles of the type of the prior art, integral nozzle and rocket motor case fabrication are limited and when a large length to diameter rocket motor case with an integral nozzle is required, the rocket motor case utilizing the helix angles in conventional structure does not allow the rocket motor case with the integral nozzle to have sufficient axial stiffness to provide the stiffness required for a rocket motor case of the type needed.

Therefore, it is an object of this invention to provide a method for making a rocket motor case with an integral nozzle that can be wound and still provide the axial stiffness needed.

Another object of this invention is to provide a method for making an integral rocket motor case and nozzle in which the apparatus used to wind the rocket motor case and integral nozzle is conventional apparatus.

Still another object of this invention is to provide a method for making a rocket motor case with integral nozzle in which the length to diameter ratio is about 15-20 to 1.

Still a further object of this invention is to provide a method for making a rocket motor case with an integral nozzle in which the fibers are oriented at about 5 to 11 degrees relative to the axis of the rocket motor case to provide stiffness.

Other objects and advantages of this invention will be obvious to those skilled in this art.

SUMMARY OF THE INVENTION

In accordance with this invention, a method for making a rocket motor case with an integral nozzle which has a large length to diameter ratio and sufficient axial stiffness to withstand bending is provided by the following method which includes providing a mandrel with the desired length and shape for the rocket motor case with the integral nozzle with a nozzle insert mounted on the mandrel to form a throat reinforced area for the rocket motor and nozzle structure, winding of axial fibers about said mandrel structure at an angle relative to the axis of the mandrel to provide sufficient axial stiffness to the rocket motor and integral nozzle structure when cured, after the mandrel has been completely covered with said axial fiber winding, applying radial fiber winding about said rocket motor case from the nozzle insert and dome shaped structure to the distal end of the rocket motor structure, applying radial winding fiber structure at the nozzle end of the rocket motor structure, cutting the linear wound fibers at the nozzle end of the rocket motor structure, necking down and causing the linear fibers to conform to the outer shape of the nozzle insert and at the same time causing the fibers to slip from the nozzle end relative to the mandrel to allow the linear wound fibers to conform to the outer shape of the nozzle insert, winding radial fiber structure about the axial fibers at the nozzle insert to fill in between the radial windings and to fill in and build up the area at the nozzle insert, and finally removing the wound rocket motor case and mandrel and placing them in an oven to cure in a conventional manner. After curing, the mandrel is separated from the rocket motor case and integral nozzle in a conventional manner.

DESCRIPTION OF THE PREFERRED EMBODIMENT

Figure 2:
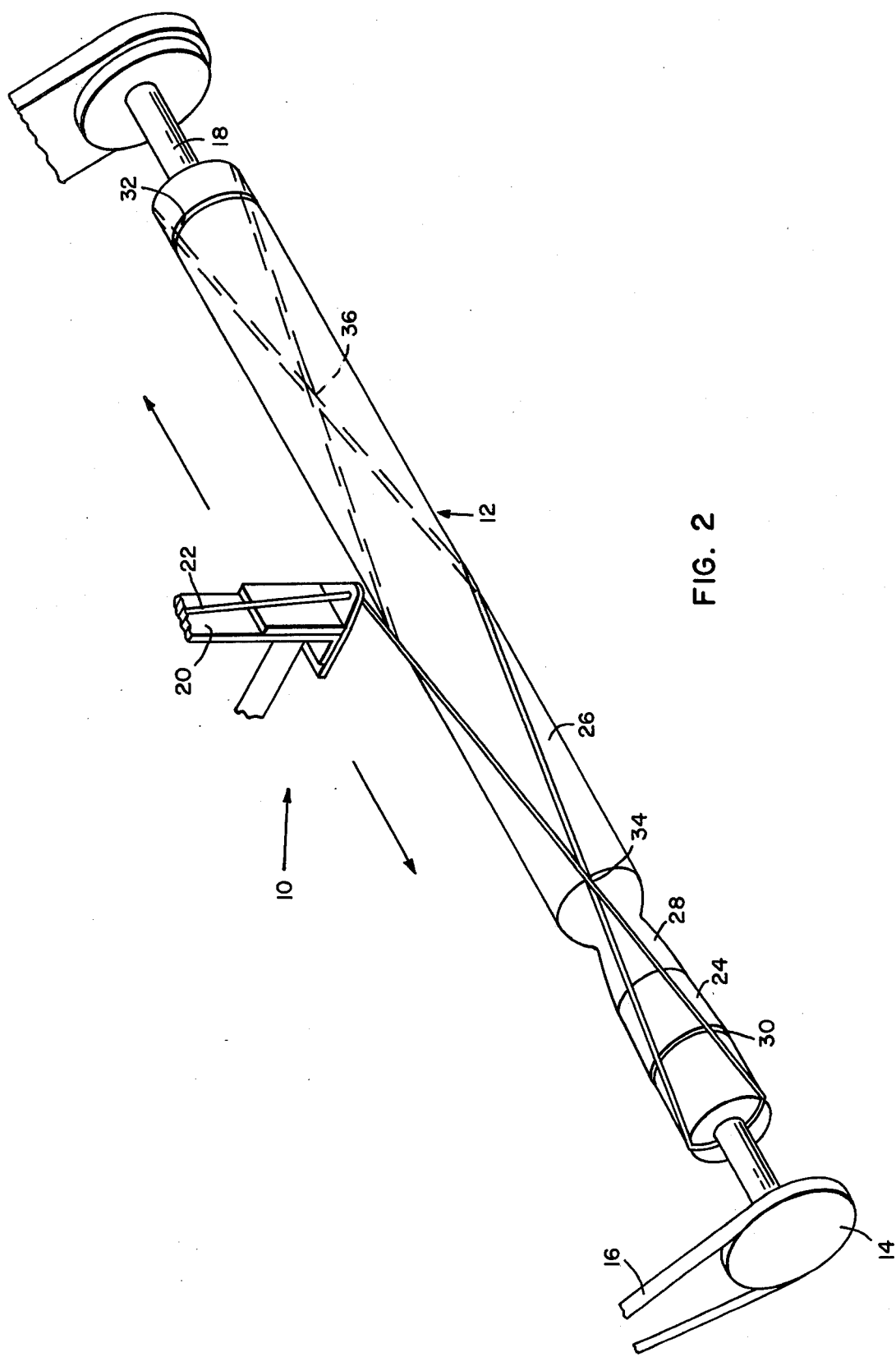
FIG. 2 is a perspective view illustrating the winding of the axial fibers about a mandrel in accordance with this invention.

Referring now to the drawings, FIG. 2 schematically illustrates the winding operation in which a conventional winding machine 10 has mandrel 12 mounted therein at opposite ends in a conventional manner to be driven at end 14 by conventional drive means 16. End 18 is mounted for rotation in a conventional manner. Movable arm 20 is provided for movement back and forth as illustrated and for feeding a strand of reinforcing fibers 22 for wrapping the rocket motor case with the fibers. Fibers 22 can be made of graphite, fiberglass, or aromatic polyamides such as (Kevlar 49 made by E. I. du Pont de Nemours and Co.). Also, a combination of these fibers can be used in fabrication of the rocket motor case with the integral nozzle. In practice, graphite fibers have been proven to work acceptably as well as a combination of graphite fibers and Kevlar 49 fibers. Fiber strand 22 has a multiplicity of individual fiber strands therein and that successfully used in making the rocket motor case with the integral nozzle has included 640 fiber strands bundled together in a ribboned type structure. Mandrel 12 is made up of a forward section 24 and rear or aft section 26 with metal nozzle insert 28 clamped therebetween to define the shape and diameters for the internal structure of the integrally wound rocket motor and nozzle. Forward mandrel 24 has a groove 30 therein and rear mandrel section 26 has a groove 32 therein.

Figure 1:
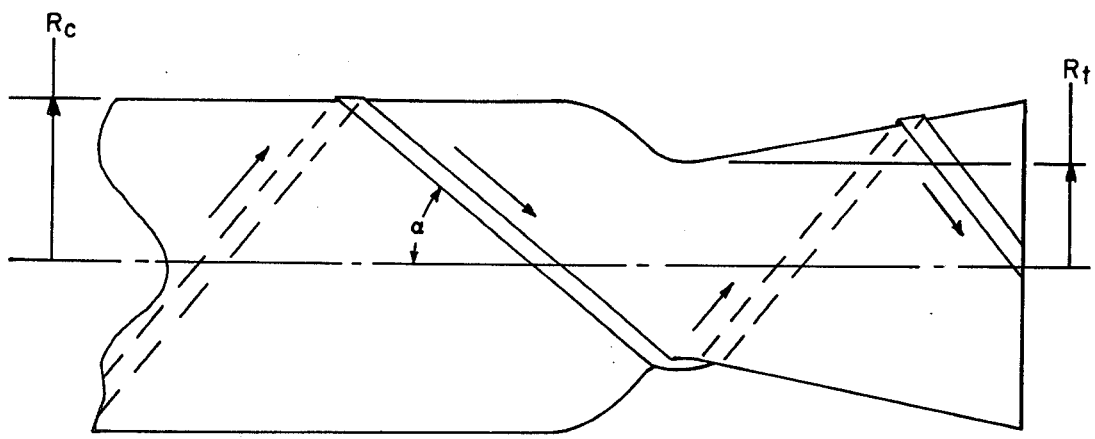
FIG. 1 is a schematic view illustrating the winding of fibers about a conventional geodesic integrally wound nozzle and rocket motor case in the prior art.
Figure 3:
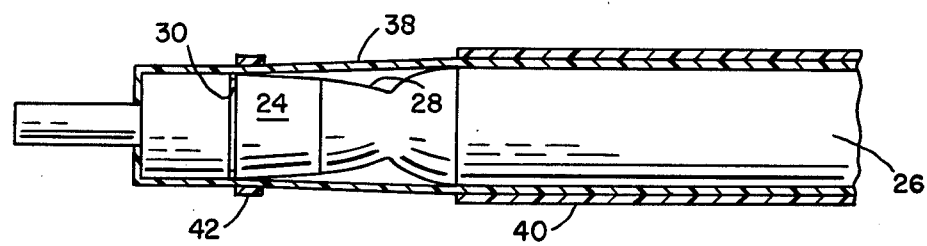
FIG. 3 is a sectional view partially cutaway and illustrating both axial and radial fibers applied to the mandrel and FIG. 4 is a sectional view partially cutaway and illustrating that the first axial layer of fibers has been cut, slipped and finally made to conform to the outer surface of the nozzle insert with radial wound fibers being applied over the axial fibers.
Figure 4:
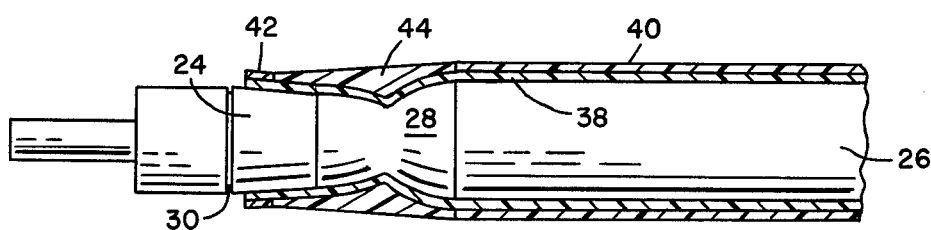

When ready for winding, the outer surface of mandrel 12 is prepared in a conventional manner for the winding of the fiber motor case and integral nozzle thereabout. When it is desired to wind and make the rocket motor case and integral nozzle, the speed of mandrel 12 is set to make about 2 revolutions as radial arm 20 moves back and forth to make one complete loop about mandrel 12 as illustrated in FIG. 2. Fiber 22 is pre-impregnated with conventional epoxy resin for bonding and securing the fibers together when in a cured state. Fiber 22 is secured at one end such as at 18 and wound about mandrel 12 to cross at positions 34 and 36 as illustrated. Mandrel 12 continues to rotate and arm 20 continues to move back and forth until the outer surface of mandrel 12 is completely covered with fibers 22. It is noted that fibers 22 are running linearly of mandrel 12 and at an angle of about 8 degrees to that of the axis of mandrel 12. Also, fibers 22 at nozzle insert 28 do not wrap around the nozzle section as in the prior art, but rather bridge across from rear section 26 to forward section 24 as more specifically illustrated in FIG. 3. Fiber strands 22 that are placed linearly of mandrel 12 at about 8 degrees are placed at this small angle in order to provide sufficient axial stiffness for the large length to diameter ratio of the rocket motor case and integral nozzle. Once mandrel 12 has been completely covered with the strands of fibers 22 to provide layer 38 as illustrated in FIG. 3, radial plies 40 are wound radially about the rear mandrel section 26 as illustrated and then a short radial wrapping 42 is made just rear of groove 30 as illustrated in FIG. 3. Next, fibers 38 are cut at groove 30 to separate and allow the section of linear fibers adjacent the outer surface of nozzle insert 28 to be necked down and caused to conform to the outer shape of nozzle insert 28 and the nozzle end of the mandrel as the cut ends at radial wrapping 42 slides linearly away from groove 30. This step can be carried out manually by squeezing the linear fibers adjacent nozzle insert 28 to cause the fibers to conform to the outer shape and/or by wrapping a strand of fibers around this section and rotating the mandrel and causing the fibers to be necked down and pressed onto the outer configuration of the nozzle insert. When linear layer 38 has been made to conform to the outer configuration of nozzle insert 28 as illustrated in FIG. 4, the space between radial layers 40 and 42 is filled in by radially wrapping this area with fibers 22 to fill in as illustrated at 44 and provide the desired structure and strength of the structure. If desired, additional radial plies can be wrapped on the rocket motor structure as desired to provide the radial strength needed for the rocket motor case and integral nozzle structure. Once winding of the rocket motor case and integral nozzle is complete, the strands are cut at groove 32 to define the distal end of the rocket motor case. Mandrel 12 with the rocket motor case wound thereon is then removed from the winding machine and placed in an oven for curing the fibers with the epoxy resin that was placed on fibers 22 as they were being wound into the rocket motor and integral nozzle structure. After curing of the rocket motor and integral nozzle in a conventional manner, the cured rocket motor and integral nozzle structure are removed from mandrel sections 24 and 26 in a conventional manner. If desired, the outer surface of cured rocket motor and integral nozzle structure can be machined to provide a smooth shape of the outer surface desired.

In practice, strands 22, made of graphite have been used to form the linear structure of the rocket motor and either graphite or Kevlar 49 has been used in radial plies 40, 42, and 44 as well as a combination of these two materials. Several rocket motors with integral nozzle structures of this type have been produced and an acceptable length to diameter ratio produced has been a rocket motor and integral nozzle length of 30 inches with an internal diameter of the rocket motor chamber being 1.75 inches with a throat diameter of nozzle insert 28 being 1 inch in diameter. The linear wrapping of the first layer of the rocket motor case has been successfully carried out at an angle of 8 degrees, but angles of about 0 to about 15 degrees can be used in the linear wrapping of the first layer. Preferred angles are about 5 to 11 degrees. The particular angle used will depend upon the particular axial stiffness requirements of the rocket motor case. It is also pointed out that other ratios of the length to diameter than that specifically set forth can be used in making a rocket motor case with an integral nozzle in accordance with this invention and generally the length to diameter ratio of the rocket motor case with the integral nozzle should be about 15–20 to 1 but may be 30 to 1.

We claim:

1. A method of making a rocket motor case with an integral nozzle comprising: providing a mandrel that has forward and aft sections with a necked down nozzle insert section mounted therebetween and said forward and aft sections and said nozzle insert having external configurations that define the desired internal configuration shape of a rocket motor case with an integral nozzle, said mandrel being mounted about a center line axis through said forward and aft mandrel sections and said nozzle insert, winding strands of reinforcing fibers about said mandrel at an angle of about 0 to about 15 degrees relative to said center line axis until said mandrel has the external surface completely covered with the winding strands radially spaced from an external portion of said necked down nozzle insert, radially wrapping fibers about the wound fiber on said aft section of said mandrel, radially wrapping fibers about the wound fibers at the forward end of said mandrel, cutting the linear fibers at the forward end of said mandrel beyond said radial wrapping thereon, squeezing the linear fibers between said two radial wrappings of fiber to cause said linear fibers to conform to the external shape of said nozzle insert, radially wrapping fibers about said nozzle insert from the smallest diameter thereof outwardly toward said other radially wrapped fibers to provide a rocket motor with an integral nozzle that has linear fibers for providing stiffness and radial fibers for providing burst strength.

2. The method of making a rocker motor case with an integral nozzle as defined in claim 1, wherein said rocket motor case and integral nozzle has a length to the internal diameter of the rocker nozzle of a ratio of about 15–20 to 1.

3. The method of making a rocket motor case and integral nozzle as defined in claim 1, wherein said fibers are pre-impregnated with an epoxy resin before being wound into said rocket motor case and integral nozzle structure, and wherein said integrally wound rocket motor case and nozzle that has been wound on said mandrel are placed in an oven and cured.

4. The method of making a rocket motor case and integral nozzle as defined in claim 3, wherein said rocket motor case and integral nozzle have the external surface thereof machined to the desired configuration after being cured.

* * * * *